United States Patent

Shao et al.

[11] Patent Number: 6,159,759
[45] Date of Patent: Dec. 12, 2000

[54] METHOD TO FORM LIQUID CRYSTAL DISPLAYS USING A TRIPLE DAMASCENE TECHNIQUE

[75] Inventors: Kai Shao; Cerdin Lee; Yi Xu; Shao-Fu Sanford Chu, all of Singapore, Singapore

[73] Assignee: Chartered Semiconductor Manufacturing Ltd., Singapore, Singapore

[21] Appl. No.: 09/443,423

[22] Filed: Nov. 19, 1999

[51] Int. Cl.⁷ .................................................. H01L 21/00
[52] U.S. Cl. ........................... 438/30; 438/618; 438/622; 438/637; 438/675; 257/59; 257/72
[58] Field of Search ............... 438/30, 637, 675, 438/618, 622, 29; 257/59, 72; 349/38, 39, 44, 46

[56] References Cited

U.S. PATENT DOCUMENTS

| | | | |
|---|---|---|---|
| 5,614,427 | 3/1997 | den Boer et al. | 437/40 |
| 5,693,237 | 12/1997 | Bodensohn | 216/23 |
| 5,852,481 | 12/1998 | Hwang | 349/43 |
| 5,879,959 | 3/1999 | Chen | 438/30 |

*Primary Examiner*—Long Pham
*Attorney, Agent, or Firm*—George O. Saile; Rosemary L. S. Pike

[57] ABSTRACT

A new method of forming liquid crystal displays has been achieved. Metal conductors are provided in an insulating layer overlying a semiconductor substrate. A first isolation layer is deposited. A first silicon nitride layer is deposited. The first silicon nitride layer is patterned to form openings for planned vias overlying the metal conductors. A second isolation layer is deposited. A second silicon nitride layer is deposited. The second silicon nitride layer is patterned to form masks overlying where dummy supports for the metal pixels are planned and to form openings to extend the planned vias. A third isolation layer is deposited. The third isolation layer is patterned to form openings for the planned metal pixels. The second isolation layer and the first isolation layer are etched through to complete the vias and the dummy supports. A metal layer is deposited filling the openings for the metal pixels, the dummy support, and the vias. The metal layer is polished down to the top surface of the third isolation layer to complete the metal pixels. A thin film passivation is deposited. A liquid crystal layer is deposited. A transparent image point electrode is formed to complete the liquid crystal display.

20 Claims, 5 Drawing Sheets

METHOD TO FORM LIQUID CRYSTAL DISPLAYS USING A TRIPLE DAMASCENE TECHNIQUE

BACKGROUND OF THE INVENTION

1. Field of the Invention

The invention relates to a method of fabricating semiconductor structures, and more particularly, to a method of forming liquid crystal displays (LCD) where a triple damascene technique is used to create a uniform thickness in the liquid crystal material in the manufacture of integrated circuit devices.

2. Description of the Prior Art

Liquid crystal displays (LCD) are used in the art for a variety of applications from watches to computer screens. Typically, the liquid crystal display layer is built upon an array of metal pixels. The metal pixels are formed overlying a bottom substrate. A transparent material overlies the LCD layer to form a top substrate.

FIG. 1 illustrates a LCD integrated circuit device of the prior art. A semiconductor substrate 10 is shown. An insulating layer 14 is formed overlying the semiconductor substrate 10. Metal traces 18 are formed in the insulating layer 14. Metal plugs 22 are formed to provide vias to the metal traces 18. Metal pixels 26 are then formed overlying the insulating layer 14 and contacting the metal plugs 22. A passivation layer 30 is deposited overlying the metal pixels 26. A layer of liquid crystal display material 38 is then sandwiched between the passivation layer 30 and the transparent layer 46. Glass spacers 34 maintain a gap between the passivation layer 30 and the transparent layer 46.

Several problems are encountered in the prior art LCD structure. First, because the metal pixels are formed by first depositing a metal layer and then etching it to form the pixel shapes, the quality of the pixel image is affected by the metal etch and post clean processes. Second, the large size of the metal pixels compared to the relatively small spaces between them can cause microloading effects during the metal etch process. Third, the transparent image point electrode formed by patterning the transparent layer 46 can become unsupported or can sag 42 if the glass supports land between metal lines as shown by 43. This causes the thickness of the liquid crystal material 38 to vary and the image is adversely affected. Fourth, the presence of metal sidewalls causes reflection angles 44 from the liquid crystal that can cause image problems.

Several prior art approaches disclose methods to fabricate LCD integrated circuit devices. U.S. Pat. No. 5,879,959 to Chen shows a liquid crystal display with an upper metal gate. U.S. Pat. No. 5,693,237 to Bodensohn discloses a process to form a LCD that is supported by a planarizing insulating layer surface. U.S. Pat. No. 5,614,427 to den Boer et al teaches a design for an active matrix LCD. U.S. Pat. No. 5,852,481 to Hwang shows a method for forming metal layers in a LCD.

SUMMARY OF THE INVENTION

A principal object of the present invention is to provide an effective and very manufacturable method of fabricating liquid crystal displays in the manufacture of integrated circuits.

A further object of the present invention is to provide a method to fabricate liquid crystal displays where a triple damascene structure is used to form the metal pixels thus eliminating problems with liquid crystal thickness variance, glass support problems, and metal edge reflection.

A further object of the present invention is to provide a method to fabricate liquid crystal displays where dummy supports are formed under the metal pixels to improve the planarity of the pixel top surfaces.

In accordance with the objects of this invention, a new method of forming liquid crystal displays has been achieved. A semiconductor substrate is provided. Metal conductors are provided in an insulating layer overlying the semiconductor substrate. A first isolation layer is deposited overlying the metal conductors and the insulating layer. A first silicon nitride layer is deposited overlying the first isolation layer. The first silicon nitride layer is patterned to form openings for planned vias overlying the metal conductors. A second isolation layer is deposited overlying the first silicon nitride layer and the first isolation layer. A second silicon nitride layer is deposited overlying the second isolation layer. The second silicon nitride layer is patterned to form masks overlying where dummy supports for the metal pixels are planned and to form openings to extend the planned vias. A third isolation layer is deposited overlying the second silicon nitride layer and the second isolation layer. The third isolation layer is patterned to form openings for the planned metal pixels. The second isolation layer and the first isolation layer are etched through to complete the vias and the dummy supports. A metal layer is deposited overlying the third isolation layer and filling the openings for the metal pixels, the dummy supports, and the vias. The metal layer is polished down to the top surface of the third isolation layer to complete the metal pixels. A thin film passivation is deposited overlying the metal pixels and the third isolation layer. A liquid crystal layer is deposited overlying the thin film passivation. A transparent image point electrode is formed overlying the liquid crystal layer to complete the liquid crystal display, and the integrated circuit device is completed.

BRIEF DESCRIPTION OF THE DRAWINGS

In the accompanying drawings forming a material part of this description, there is shown.

DESCRIPTION OF THE PREFERRED EMBODIMENTS

These embodiments disclose the application of the present invention to the formation of liquid crystal displays. It should be clear to those experienced in the art that the present invention can be applied and extended without deviating from the scope of the present invention.

Figure 1:
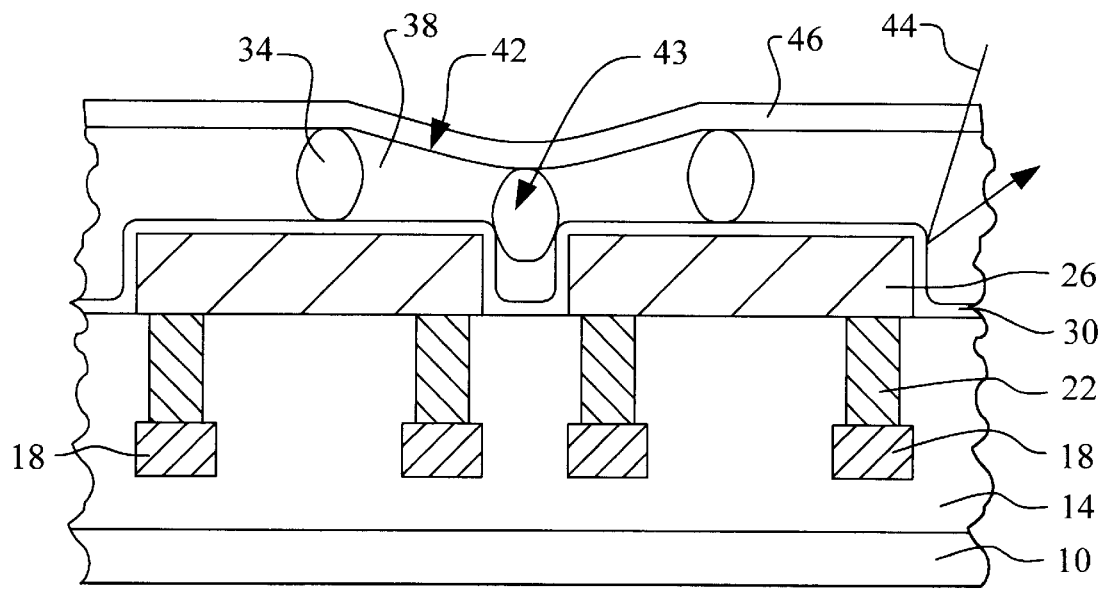
FIG. 1 schematically illustrates in cross-section a partially completed prior art integrated circuit device. A liquid crystal display structure is shown.
Figure 2:
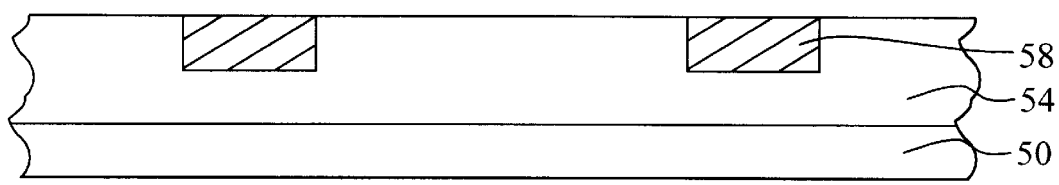
FIGS. 2 through 11 schematically illustrate in cross-sectional representation a preferred embodiment of the present invention.

Referring now particularly to FIG. 2, there is shown a cross section of a partially completed integrated circuit device of the preferred embodiment. A semiconductor substrate 50, typically comprising monocrystalline silicon, is provided. The semiconductor substrate 50 includes semiconductor device structures formed within a semiconductor wafer and layers overlying the wafer formed prior to the formation of an insulating layer 54. Note that these semiconductor devices structures, not shown, are typically formed within the wafer and within layers overlying the wafer. All of theses devices and layers are represented by the semiconductor substrate 50. The insulating layer 54 is provided overlying the semiconductor substrate 50. The insulating layer 54 is typically composed of silicon dioxide. Metal conductors 58 are formed in the insulating layer 54 as is conventional in the art. The metal conductors 58 comprise either aluminum or copper and may be formed using, for example, a damascene approach. These conductors are typically control lines for the subsequently formed metal pixels.

Figure 3:
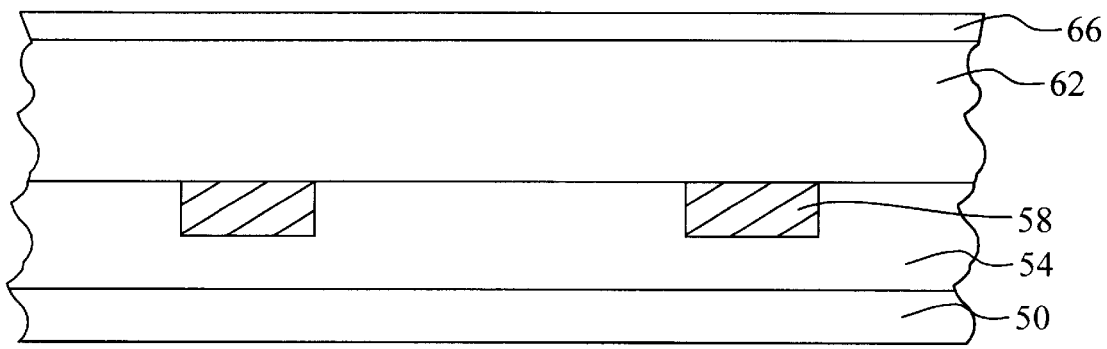

Referring now to FIG. 3, a first isolation layer 62 is deposited overlying the metal conductors 58 and the insulating layer 54. The first isolation layer 62 preferably comprises silicon dioxide or a low dielectric constant material such as: tetraethylorthosilicate (TEOS), high density plasma (HDP) oxide, fluorinate silicate glass (FSG), chemical vapor deposited (CVD) oxide, or a spin-on, low-k material. The purpose of the first isolation layer 62 is to provide a part of the interlevel isolation between the metal conductors 58 and the metal pixels. The first isolation layer 62 is conventionally deposited to a thickness of between about 4,000 Angstroms and 6,000 Angstroms.

A first silicon nitride layer 66 is deposited overlying the first isolation layer 62. The first silicon nitride layer 66 will be used to form a hard mask for the via etch. The first silicon nitride layer 66 is deposited using plasma enhanced chemical vapor deposition (PECVD) to a thickness of between about 500 Angstroms and 1,500 Angstroms.

Figure 4:
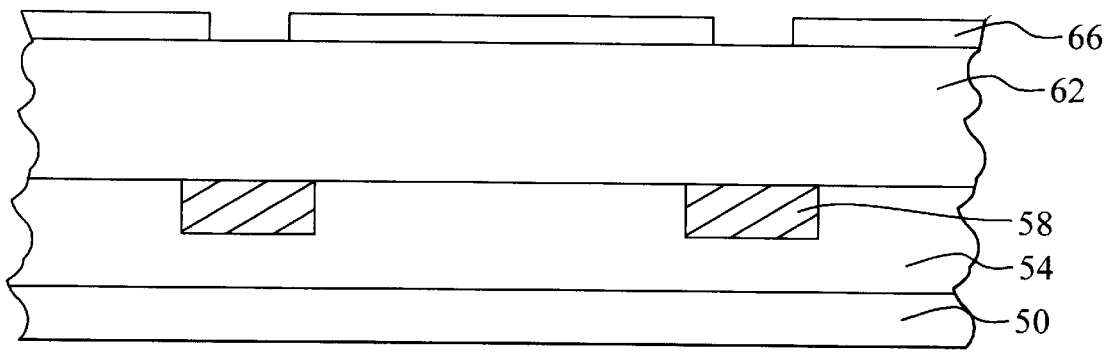

Referring now to FIG. 4, an important part of the present invention is shown. The first silicon nitride layer 66 is patterned to form openings for planned vias. The vias will extend through the first isolation layer 62 to provide connectivity to the metal conductors 58. A conventional photolithography process may be used to pattern the first silicon nitride layer 66. The remaining silicon nitride acts as a hard mask for the subsequent etching step.

Figure 5:
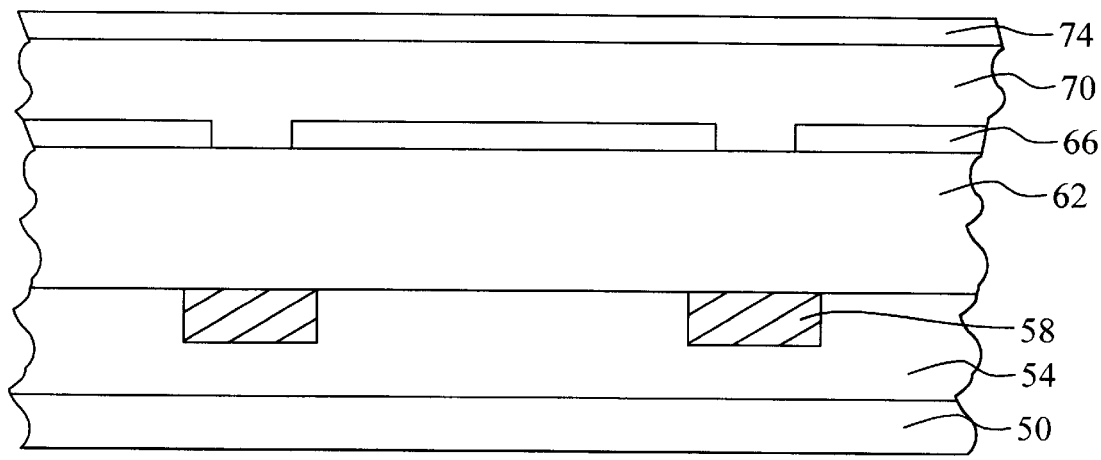

Referring now to FIG. 5, a second isolation layer 70 is deposited overlying the patterned first silicon nitride layer 66 and the first isolation layer 62. The second isolation layer 70 will form another part of the interlevel isolation between the metal conductors 58 and the metal pixels. The novel dummy supports for the metal pixels will also be formed in the second isolation layer 70. The second isolation layer 70 preferably comprises silicon dioxide or a low dielectric constant material such as: tetraethylorthosilicate (TEOS), high density plasma (HDP) oxide, fluorinate silicate glass (FSG), chemical vapor deposited (CVD) oxide, or a spin-on, low-k material. The second isolation layer 70 is conventionally deposited to a thickness of between about 2,000 Angstroms and 4,000 Angstroms.

A second silicon nitride layer 74 is deposited overlying the second isolation layer 70. The second silicon nitride layer 74 will be used to form a hard mask for the etching that extends the vias through the second isolation layer 70 and that forms the dummy supports. The second silicon nitride layer 74 is deposited using plasma enhanced chemical vapor deposition (PECVD) to a thickness of between about 500 Angstroms and 1,000 Angstroms.

Figure 6:
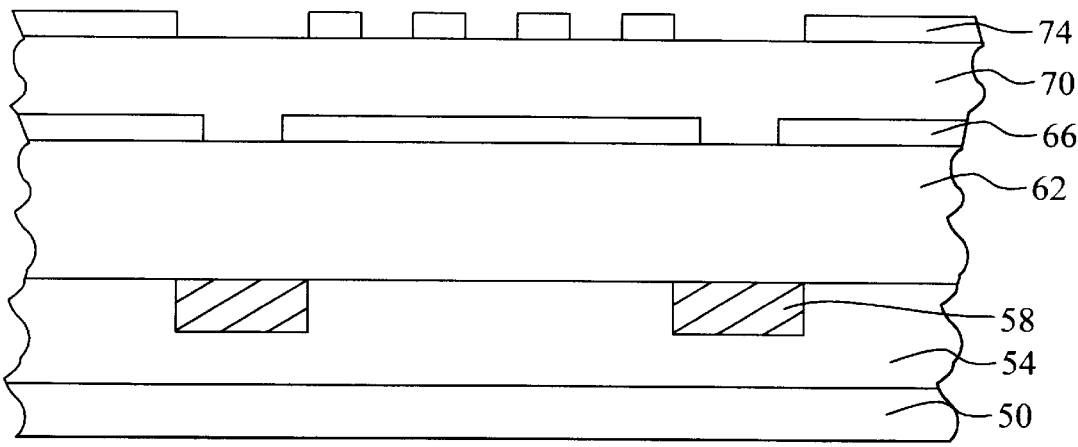

Referring now to FIG. 6, another important part of the present invention is shown. The second silicon nitride layer 74 is patterned to form masks overlying where dummy supports for the metal pixels are planned and to form openings to extend the planned vias. Note that the openings in the second silicon nitride layer 74 hard mask are somewhat larger than those in the first silicon nitride layer 66 hard mask where the vias are planned. The wider openings will allow the metal layer to fill with less opportunity for creating voids. A conventional photolithography process may be used to pattern the second silicon nitride layer 74.

Figure 7:
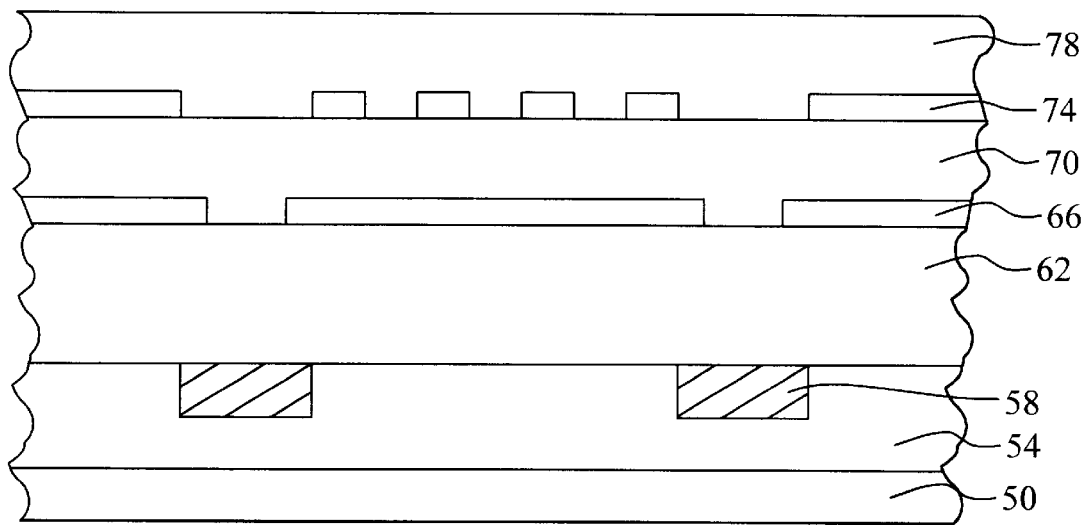

Referring now to FIG. 7, a third isolation layer 78 is deposited overlying the patterned second silicon nitride layer 74 and the second isolation layer 70. The third isolation layer 78 will isolate between adjacent metal pixels in the completed circuit. The third isolation layer 78 preferably comprises silicon dioxide or a low dielectric constant material such as: tetraethylorthosilicate (TEOS), high density plasma (HDP) oxide, fluorinate silicate glass (FSG), chemical vapor deposited (CVD) oxide, or a spin-on, low-k material. The third isolation layer 78 is conventionally deposited to a thickness of between about 1,000 Angstroms and 3,000 Angstroms.

Figure 8:
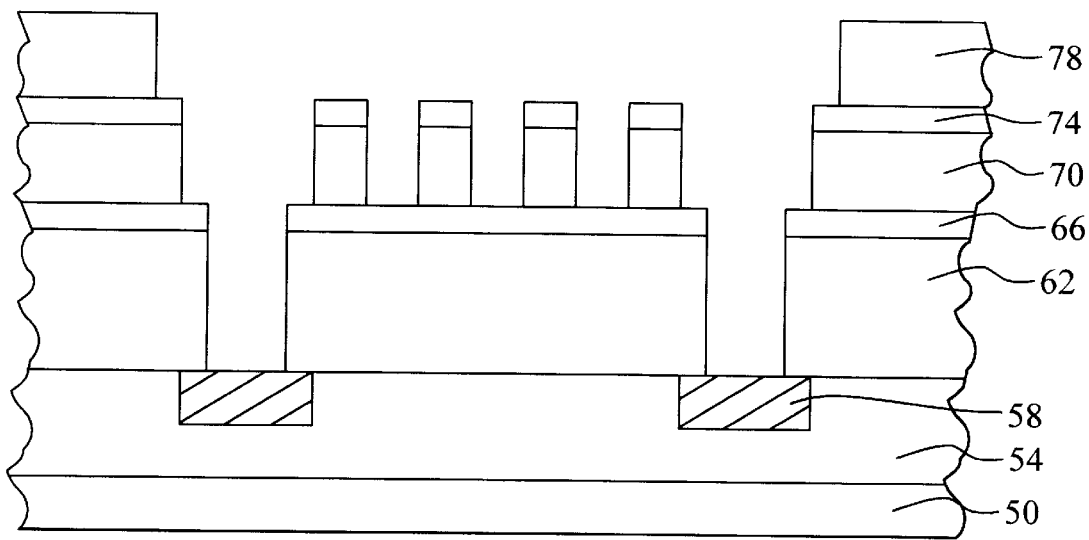

Referring now to FIG. 8, another important part of the present invention is shown. The third isolation layer 78 is patterned to form openings for the planned metal pixels. The second isolation layer 70 and the first isolation layer 62 are then etched through to complete the vias and the dummy supports. A conventional photolithography process may be used to pattern the third isolation layer 78. Typically, a dry etching process is used to etch the third isolation layer 78, the second isolation layer 70, and the first isolation layer 62 in one step.

At this point in the process, the unique triple damascene form has been completed. The trench through the third isolation layer 78 will form the shape of the metal pixel. The trenches through the second isolation layer 70 will form the dummy supports, whose function will be discussed below, and the top part of the vias that will connect the metal pixels to the underlying metal conductors 58. The trenches through the first isolation layer 62 will complete the vias.

Figure 9:
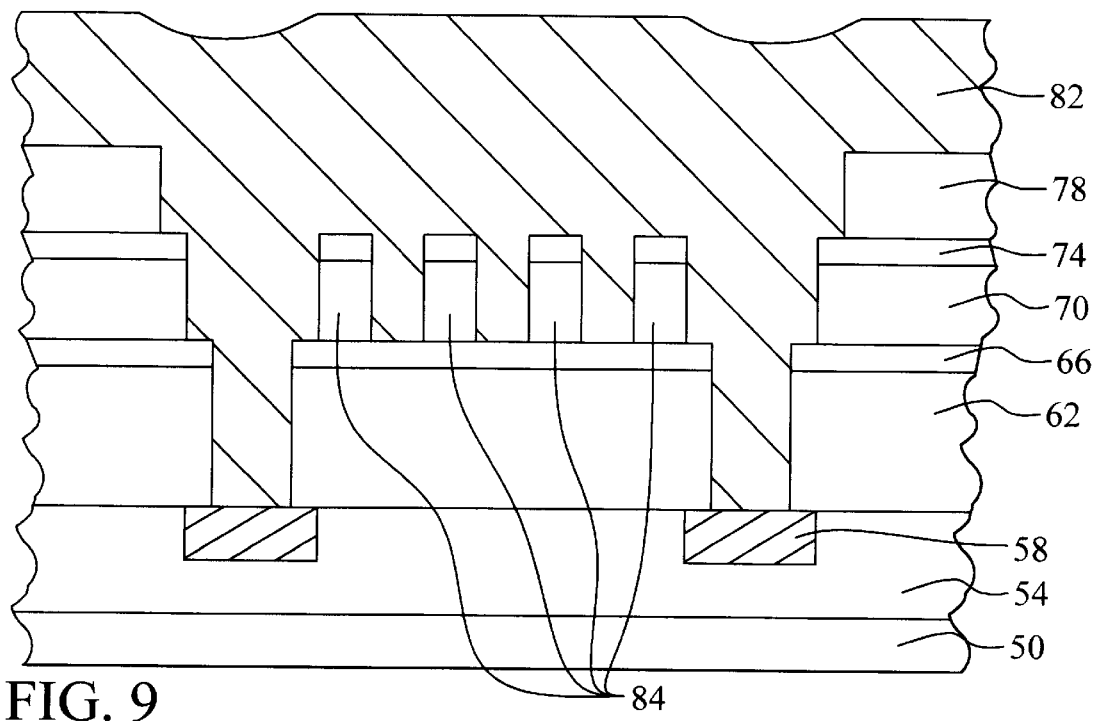

Referring now to FIG. 9, a metal layer 82 is deposited overlying the third isolation layer 78 and filling the openings for the metal pixels, the dummy supports, and the vias. The metal layer 82 may comprise aluminum or copper. The metal layer 82 may be deposited in several conventional ways, including physical vapor deposition (PVD), electrochemical plating, and electroless plating. The metal layer 82 is deposited to a thickness of between about 4,000 Angstroms and 8,000 Angstroms.

The function of the dummy supports can now be seen. Note the presence of the dummy supports. These are a series of narrow columns 84 formed by the second isolation layer 70 and the second silicon nitride layer 74. The dummy supports keep the deposited metal layer 82 from sagging in the middle span across the largest trench opening in the third isolation layer 78. If the dummy supports were not present, the metal layer would sag in the middle of the pixel area. Even after the subsequent polishing step, this sagging can cause a non-flat top surface on the metal pixel.

Figure 10:
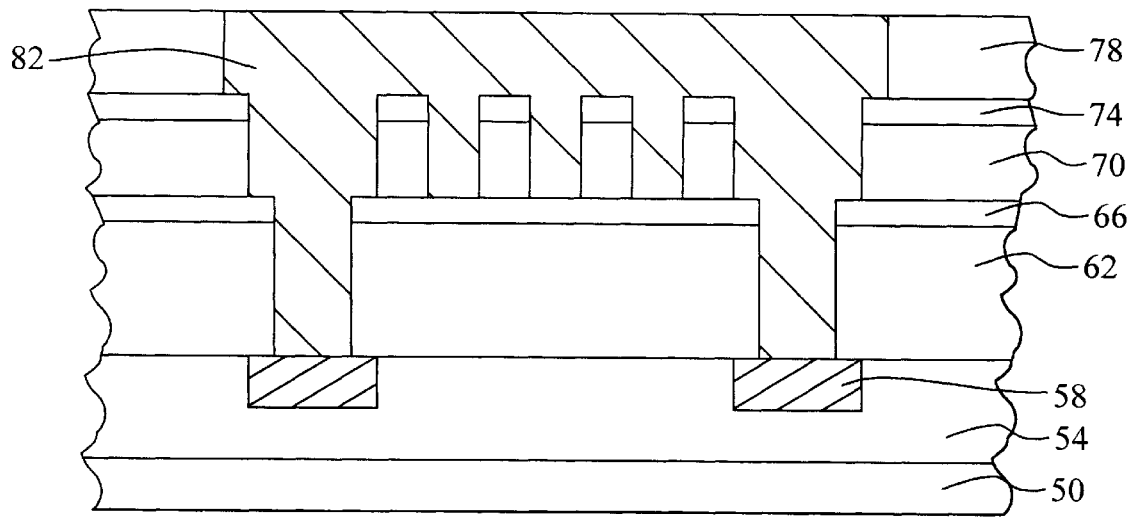

Referring now to FIG. 10, the metal layer 82 is polished down to the top surface of the third isolation layer 78 to complete the metal pixels. The polishing is accomplished using a conventional chemical mechanical polishing operation. Following the polishing step, the top surface of the metal pixel is perfectly flat. In addition, the top surface of the entire array of metal pixels, including the third isolation layer 78 between these pixels, is flat. This is an important feature of the present invention. It insures that the rest of the liquid crystal display structure will be applied to a flat substrate.

Figure 11:
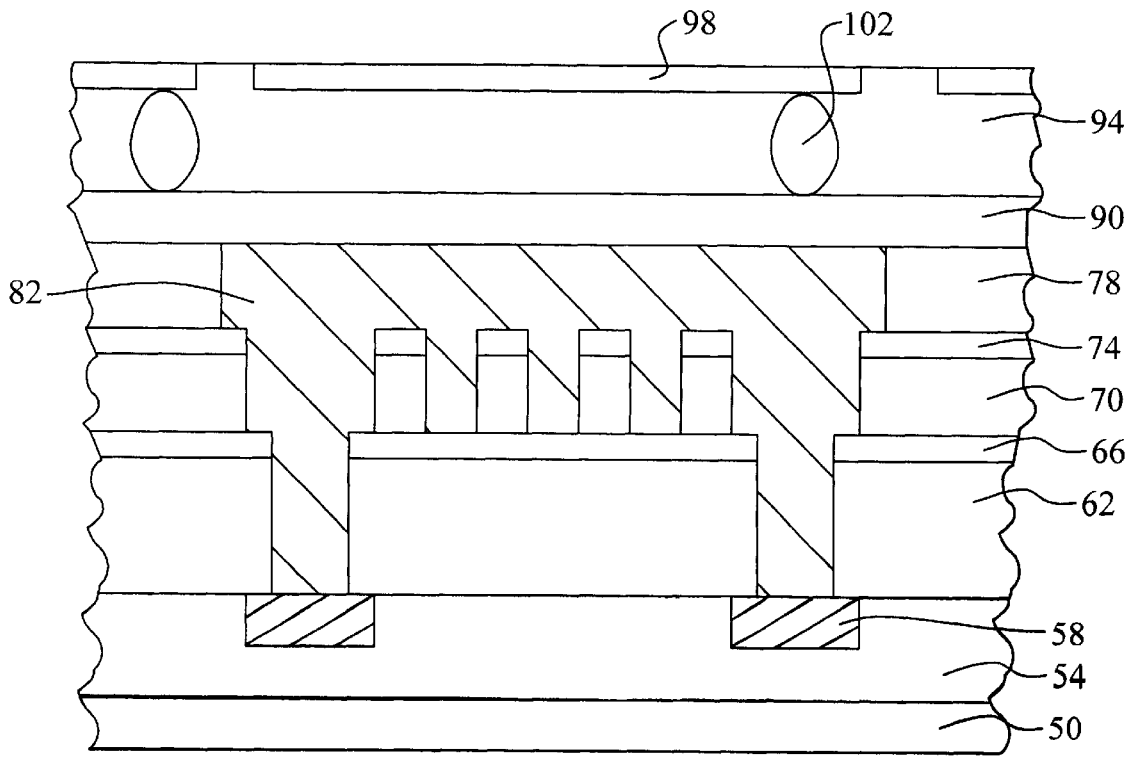

Referring now to FIG. 11, the finished cross section of the liquid crystal display is shown. A thin film passivation 90 is deposited overlying the metal pixels 82 and the third isolation layer 78. The thin film passivation 90 is typically a composite of layers of silicon dioxide and silicon nitride. In the preferred embodiment, the thin film passivation is deposited to a thickness of between about 500 Angstroms and 2,500 Angstroms.

A liquid crystal layer 94 is deposited conventionally overlying the thin film passivation 90. A transparent image point electrode 98 is formed overlying the liquid crystal layer to complete the liquid crystal display, and the integrated circuit device is completed.

The advantages of the present invention over the prior art can now be clearly seen. First, the metal pixels are perfectly flat and planar with the top isolation layer so there are no metal edge reflection angles. Second, the metal pixel shapes are better controlled because the etching process is on an isolation material, typically silicon dioxide, rather than on metal. Third, the thickness of the liquid crystal material is consistent across the array. There are no trenches for the glass supports 102 to land in as in the prior art. The present invention improves the prior art technique and creates an improved liquid crystal display.

As shown in the preferred embodiments, the present invention provides a very manufacturable process for fabricating liquid crystal display integrated circuit devices.

While the invention has been particularly shown and described with reference to the preferred embodiments thereof, it will be understood by those skilled in the art that various changes in form and details may be made without departing from the spirit and scope of the invention.

What is claimed is:

1. A method to form metal pixels in the fabrication of a liquid crystal display integrated circuit device comprising:

providing a semiconductor substrate;

providing metal conductors in an insulating layer overlying said semiconductor substrate;

depositing a first isolation layer overlying said metal conductors and said insulating layer;

depositing a first silicon nitride layer overlying said first isolation layer;

patterning said first silicon nitride layer to form openings where vias are planned;

depositing a second isolation layer overlying said first silicon nitride layer and said first isolation layer;

depositing a second silicon nitride layer overlying said second isolation layer;

patterning said second silicon nitride layer to form masks overlying planned dummy supports and to form openings to extend said planned vias;

depositing a third isolation layer overlying said second silicon nitride layer and said second isolation layer;

patterning said third isolation layer to form openings for planned metal pixels;

etching through said second isolation layer and said first isolation layer to complete said vias and said dummy supports;

depositing a metal layer overlying said third isolation layer and filling said vias and said metal pixels;

polishing down said metal layer to the top surface of said third isolation layer to complete said metal pixels; and completing said liquid crystal display integrated circuit device.

2. The method according to claim 1 wherein said semiconductor substrate includes semiconductor device structures formed within a semiconductor wafer and layers overlying the wafer formed prior to the formation of an insulating layer.

3. The method according to claim 1 wherein said first isolation layer comprises one of the group of: silicon dioxide, tetraethylorthosilicate (TEOS), high density plasma (HDP) oxide, fluorinate silicate glass (FSG), chemical vapor deposited (CVD) oxide, and a spin-on, low-k material where said first isolation layer is deposited to a thickness of between about 4,000 Angstroms and 6,000 Angstroms.

4. The method according to claim 1 wherein said first silicon nitride layer is deposited to a thickness of between about 500 Angstroms and 1,500 Angstroms.

5. The method according to claim 1 wherein said second isolation layer comprises one of the group of: silicon dioxide, tetraethylorthosilicate (TEOS), high density plasma (HDP) oxide, fluorinate silicate glass (FSG), chemical vapor deposited (CVD) oxide, and a spin-on, low-k material where said first isolation layer is deposited to a thickness of between about 2,000 Angstroms and 4,000 Angstroms.

6. The method according to claim 1 wherein said second silicon nitride layer is deposited to a thickness of between about 500 Angstroms and 1,000 Angstroms.

7. The method according to claim 1 wherein said third isolation layer comprises one of the group of: silicon dioxide, tetraethylorthosilicate (TEOS), high density plasma (HDP) oxide, fluorinate silicate glass (FSG), chemical vapor deposited (CVD) oxide, and a spin-on, low-k material where said first isolation layer is deposited to a thickness of between about 1,000 Angstroms and 3,000 Angstroms.

8. The method according to claim 1 wherein said metal layer is deposited to a thickness of between about 4,000 Angstroms and 8,000 Angstroms.

9. The method according to claim 1 wherein said step of polishing down is by chemical mechanical polishing.

10. The method according to claim 1 further comprising:

depositing a thin film passivation overlying said metal pixels and said third isolation layer;

depositing a liquid crystal layer overlying said thin film passivation; and forming a transparent image point electrode overlying said liquid crystal layer.

11. A method to form metal pixels in the fabrication of a liquid crystal display integrated circuit device comprising:

providing a semiconductor substrate wherein said semiconductor substrate includes semiconductor device structures formed within a semiconductor wafer and layers overlying the wafer formed prior to the formation of an insulating layer;

providing metal conductors in an insulating layer overlying said semiconductor substrate;

depositing a first isolation layer overlying said metal conductors and said insulating layer;

depositing a first silicon nitride layer overlying said first isolation layer;

patterning said first silicon nitride layer to form openings where vias are planned;

depositing a second isolation layer overlying said first silicon nitride layer and said first isolation layer;

depositing a second silicon nitride layer overlying said second isolation layer;

patterning said second silicon nitride layer to form masks overlying planned dummy supports and to form openings to extend said planned vias;

depositing a third isolation layer overlying said second silicon nitride layer and said second isolation layer;

patterning said third isolation layer to form openings for planned metal pixels;

etching through said second isolation layer and said first isolation layer to complete said vias and said dummy supports;

depositing a metal layer overlying said third isolation layer and filling said vias and said metal pixels;

polishing down said metal layer to the top surface of said third isolation layer to complete said metal pixels;

depositing a thin film passivation overlying said metal pixels and said third isolation layer;

depositing a liquid crystal layer overlying said thin film passivation; and forming a transparent image point electrode overlying said liquid crystal layer; and completing said liquid crystal display integrated circuit device.

12. The method according to claim 11 wherein said first isolation layer comprises one of the group of: silicon dioxide, tetraethylorthosilicate (TEOS), high density plasma (HDP) oxide, fluorinate silicate glass (FSG), chemical vapor deposited (CVD) oxide, and a spin-on, low-k material where said first isolation layer is deposited to a thickness of between about 4,000 Angstroms and 6,000 Angstroms.

13. The method according to claim 11 wherein said first silicon nitride layer is deposited to a thickness of between about 500 Angstroms and 1,500 Angstroms.

14. The method according to claim 11 wherein said second isolation layer comprises one of the group of: silicon dioxide, tetraethylorthosilicate (TEOS), high density plasma (HDP) oxide, fluorinate silicate glass (FSG), chemical vapor deposited (CVD) oxide, and a spin-on, low-k material where said first isolation layer is deposited to a thickness of between about 2,000 Angstroms and 4,000 Angstroms.

15. The method according to claim 11 wherein said second silicon nitride layer is deposited to a thickness of between about 500 Angstroms and 1,000 Angstroms.

16. The method according to claim 11 wherein said third isolation layer comprises one of the group of: silicon dioxide, tetraethylorthosilicate (TEOS), high density plasma (HDP) oxide, fluorinate silicate glass (FSG), chemical vapor deposited (CVD) oxide, and a spin-on, low-k material where said first isolation layer is deposited to a thickness of between about 1,000 Angstroms and 3,000 Angstroms.

17. The method according to claim 11 wherein said metal layer is deposited to a thickness of between about 4,000 Angstroms and 8,000 Angstroms.

18. A method to form metal pixels in the fabrication of a liquid crystal display integrated circuit device comprising:

providing a semiconductor substrate wherein said semiconductor substrate includes semiconductor device structures formed within a semiconductor wafer and layers overlying the wafer formed prior to the formation of an insulating layer;

providing metal conductors in an insulating layer overlying said semiconductor substrate;

depositing a first isolation layer of silicon dioxide overlying said metal conductors and said insulating layer;

depositing a first silicon nitride layer overlying said first isolation layer;

patterning said first silicon nitride layer to form openings where vias are planned;

depositing a second isolation layer of silicon dioxide overlying said first silicon nitride layer and said first isolation layer;

depositing a second silicon nitride layer overlying said second isolation layer;

patterning said second silicon nitride layer to form masks overlying planned dummy supports and to form openings to extend said planned vias;

depositing a third isolation layer of silicon dioxide overlying said second silicon nitride layer and said second isolation layer;

patterning said third isolation layer to form openings for planned metal pixels;

etching through said second isolation layer and said first isolation layer to complete said vias and said dummy supports;

depositing a metal layer overlying said third isolation layer and filling said vias and said metal pixels;

polishing down said metal layer to the top surface of said third isolation layer to complete said metal pixels;

depositing a thin film passivation overlying said metal pixels and said third isolation layer;

depositing a liquid crystal layer overlying said thin film passivation; and forming a transparent image point electrode overlying said liquid crystal layer; and completing said liquid crystal display integrated circuit device.

19. The method according to claim 18 wherein said second isolation layer is deposited to a thickness of between about 2,000 Angstroms and 4,000 Angstroms.

20. The method according to claim 18 wherein said third isolation layer is deposited to a thickness of between about 1,000 Angstroms and 3,000 Angstroms.

* * * * *